US006024386A

United States Patent [19]

Spector

[11] Patent Number: 6,024,386

[45] Date of Patent: Feb. 15, 2000

[54] AROMA-GENERATING GREETING CARD

[76] Inventor: Donald Spector, 380 Mountain Rd., Union City, N.J. 07080

[21] Appl. No.: 09/072,752

[22] Filed: May 4, 1998

[51] Int. Cl.[7] ........................................ G09C 1/00

[52] U.S. Cl. ........................ 283/117; 40/124.1; 40/124.2; 40/124.6; 239/36; 239/53; 239/57; 239/59; 283/117

[58] Field of Search ............................ 40/124.1, 124.6, 40/124.2; 239/36, 53, 57, 59; 283/117; 428/16

[56] References Cited

U.S. PATENT DOCUMENTS

| | | | |
|---|---|---|---|
| 4,277,024 | 7/1981 | Spector | 239/36 |
| 4,870,764 | 10/1989 | Boone | 40/124.1 |
| 4,951,404 | 8/1990 | Lithwick | 40/124.1 |
| 5,199,745 | 4/1993 | Balsamo | 283/117 |
| 5,261,703 | 11/1993 | Lenkoff | 283/117 |
| 5,318,327 | 6/1994 | Daneshvar | 283/117 |
| 5,370,421 | 12/1994 | Kaiser | 283/117 |

*Primary Examiner*—Willmon Fridie, Jr.
*Assistant Examiner*—Daniel Phan
*Attorney, Agent, or Firm*—Michael Ebert

[57] ABSTRACT

An aroma-generating greeting card in a folder format having a front panel that folds over a rear panel. Printed on the front panel is a greeting appropriate to a given occasion, such as a holiday. Printed on the rear panel is a message related to the greeting. Mounted behind a port formed in the rear panel and blocking this port is a gas-barrier bag housing plastic beads impregnated with a fragrance whose aroma is associated with the occasion. The aroma is dischargeable through a vent in the bag lying within the confines of the port. The port is normally covered by a removable sticker which seals the vent to prevent discharge of the aroma. When a recipient receives the card and unfolds it to read the message and then peels off the sticker, the aroma is then discharged so that it can be sensed by the recipient.

10 Claims, 1 Drawing Sheet

AROMA-GENERATING GREETING CARD

BACKGROUND OF THE INVENTION

1. Field of Invention

This invention relates generally to greeting cards, and more particularly to a mailable card which not only conveys a greeting and a message related to the greeting, but also an aroma associated with the occasion for the greeting.

2. Status of Prior Art

A mailable greeting card usually takes the form of a paper folder that fits into an envelope, the front panel of the folder having printed thereon a greeting appropriate to a particular occasion, such as a birthday. The top panel folds over a rear panel on which is printed a message related to the greeting. Thus the front panel may say HAPPY BIRTHDAY and the rear panel, LONG LIFE and GOOD LUCK.

The present invention resides in a mailable greeting card of the above type which not only conveys a message, but also an aroma appropriate to the occasion. Thus an appropriate aroma for a Christmas greeting card is the scent of a X-mas tree.

By way of example, we shall assume that the occasion for a greeting card in accordance with the invention is Valentine's Day. This day which is celebrated annually on February 14, is a holiday in which it is customary to exchange romantic messages, called Valentines. While in the United States, the first Valentine's Day greeting card was produced in 1840, today millions of such cards are sold annually.

When a gentleman personally delivers or has delivered a Valentine's Day greeting card to a lady, it is traditionally accompanied by a gift in the form of a bouquet of roses packaged in a box in which the greeting card is also placed. Thus the aroma of roses is invariably associated with Valentine's Day, not that of any other fragrance, just as the aroma of lilies is associated with Easter but not with any other holiday.

But when a greeting card is mailed to a recipient, then as a practical matter, one cannot include roses in the mailing. Hence a mailed conventional Valentine's Day greeting card falls short of a proper romantic expression of affection.

Since in a greeting card in accordance with the invention, the card supplies an aroma to its recipient by means of plastic material impregnated with a fragrance, of prior art interest is the Spector U.S. Pat. No. 5,569,511. This patent discloses an aroma-generating object in which a plastic film having fine pores therein is impregnated with a volatile liquid fragrance that is exuded from the pores for a prolonged period.

Also of prior art interest is the Spector U.S. Pat. No. 4,883,692 in which a figure formed of foam-plastic material has disposed throughout its cellular structure a volatile liquid fragrance.

The problem which rules out the use of a fragrance-impregnated plastic film or other material with a printed mailable greeting card is that the volatile fragrance exuded from the film or sponge in which the fragrance is stored reacts chemically with printing inks. Because the fragrance attacks or dissolves the inks printed on the greeting card, by the time the card is received, it may not be presentable.

SUMMARY OF INVENTION

In view of the foregoing, the main object of this invention is to provide an aroma-generating greeting card which is appropriate to a given occasion and in which the aroma is one usually associated with the occasion.

More particularly, an object of this invention is to provide a greeting card of the above type in a folder format in which the discharge of aroma into the atmosphere does not take place until a recipient of the card unfolds it to read its printed message.

Also an object of this invention is to provide a multi-colored greeting card printed with inks that are chemically reactive with the fragrance stored in the card, which fragrance is held in a sealed state until such time as a recipient unfolds the card to read the message printed thereon and then remove a sealing sticker to release the aroma.

Briefly stated, these objects are attained by an aroma-generating greeting card in a folder format having a front panel that folds over a rear panel. Printed on the front panel is a greeting appropriate to a given occasion, such as a holiday. Printed on the rear panel is a message related to the greeting. Mounted behind a port formed in the rear panel and blocking the port is a gas-barrier bag housing plastic beads impregnated with a fragrance whose aroma is associated with the occasion.

The aroma is dischargeable through a vent in the bag lying within the confines of the port which is normally covered by a removable sticker. The port seals the vent to prevent discharge of the aroma. When a recipient receives the card and unfolds it to read the message and then peels off the sticker, the aroma is then discharged so that it can be sensed by the recipient.

BRIEF DESCRIPTION OF DRAWING

For a better understanding of the invention as well as other objects and further features thereof, reference is made to the following detailed description to be read in conjunction with the accompanying drawings, wherein.

DESCRIPTION OF INVENTION

Figure 1:
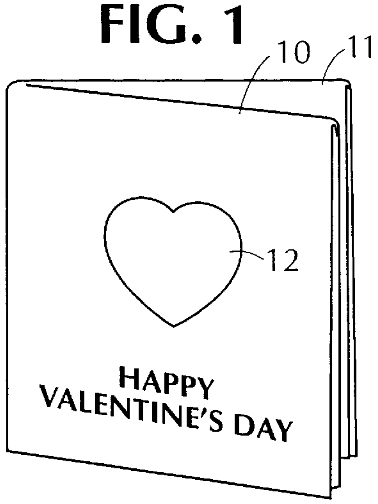
FIG. 1 is a perspective view of an aroma-generating greeting card in a folder format in accordance with the invention.

Referring now to FIG. 1, there is shown a greeting card in accordance with the invention in a folder format, the card including a front panel 10 that folds over a rear panel 11 having the same rectangular dimensions. In practice, the folder is insertable into a similarly-dimensioned envelope so that the greeting card can be mailed to the recipient for which it is intended.

By way of example, the occasion for the greeting card is Valentine's Day. Hence on front panel 10 there is printed the greeting HAPPY VALENTINE'S DAY. Also printed is a heart symbol 12 and other graphics appropriate to this occasion.

Figure 2:
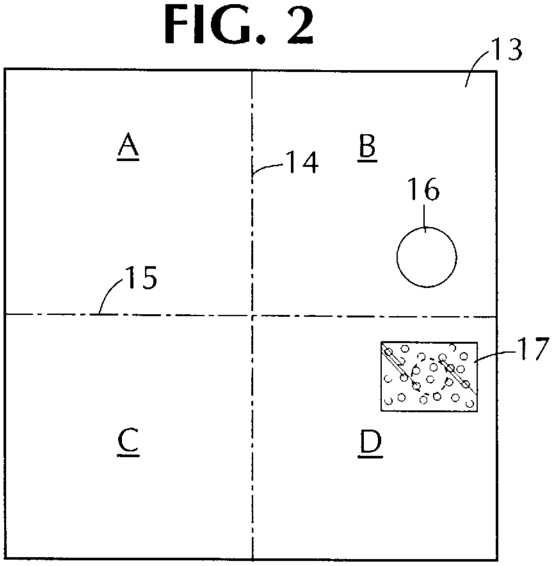
FIG. 2 is a plan view of a rectangular paper blank from which the folder is made, the blank being divided by fold lines into four quarters, a port hole being die cut in the upper right quarter and a bag containing fragrance-impregnated beads being anchored in the lower right quarter.

The greeting card is fabricated from a single rectangular blank 13 of relatively heavy high-grade paper. As shown in FIG. 2, the blank is divided by longitudinal and transverse fold lines 14 and 15 into four quarters A, B, C and D. Die cut into the upper right quarter B is a circular port 16 which in practice may have a diameter of about an inch and a half.

Figure 4:
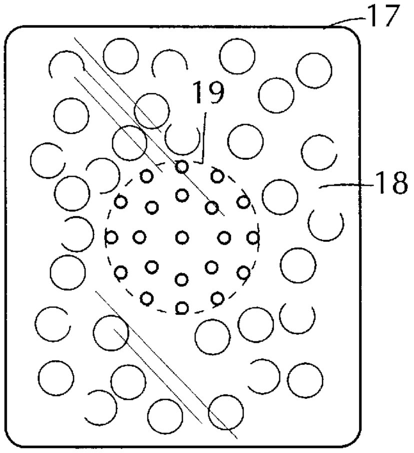
FIG. 4 is a separate view of the bag.

Anchored on the lower right quarter D is a small rectangular gas barrier bag 17. Housed in bag 17, as best seen in FIG. 4, are small plastic beads 18 impregnated with a fragrance whose aroma is associated with the occasion for the greeting card. Since the occasion is Valentine's Day, the appropriate fragrance is that of roses. The filled bag is relatively flat so that it creates only a slight bulge between the quarters forming rear panel 11.

The aroma of perfumes and perfume-based products, such as colognes and toilet water was originally derived from the essential oils of plants. However, since the early 19th century, chemists have succeeded in analyzing many essential oils and in creating thousand of synthetics, some simulating natural products and others yielding altogether new scents. Fragrances today are largely blends of natural and synthetic scents and of fixatives which equalize vaporization and enhance pungency. In most liquid scents the ingredients are combined with alcohol or other solvents.

As pointed out previously, it is customary when delivering a Valentine's Day greeting to present the recipient with a bouquet of roses. Since a greeting card in accordance with the invention is mailed, not delivered to a recipient, the presentation of a bouquet of roses is simulated, and to this end plastic beads 18 have the color of red roses. As will later be explained, these rose colored beads are placed in a graphical environment simulating a bouquet.

Because synthetic fragrances are chemically reactive with some synthetic plastics, it is essential that the plastic beads 18 be unaffected by the fragrance impregnated therein. This is why the beads are molded of porous polyethylene, polypropylene or other plastic material that is unaffected by whatever fragrance impregnates the plastic.

It is also essential that the plastic film from which gas barrier bag 17 is molded, not only be impermeable to the aroma exuded from the beads, but that it be non-reactive with the fragrance impregnating the beads contained in the bag. A suitable film material for this purpose is a transparent polyester, such as Mylar.

As shown in FIG. 4, punched in the top wall of bag 17 is a circular array 19 of pores 19 creating a vent from which the aroma exuded from the fragrance-impregnated beads is discharged into the atmosphere.

Figure 3:
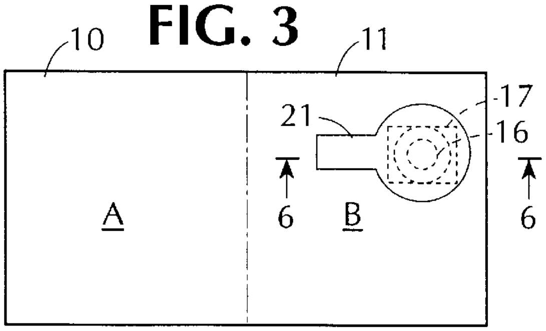
FIG. 3 shows the blank folded in half with the port then overlying the bag, and with the port sealed by a removable sticker.

When, as shown in FIG. 3, blank 13 is folded in half, then quarters A and B overlie quarters C and D to define the double ply front and rear panels 10 and 11 of the folder.

In this state, port 16 on quarter B overlies bag 17 anchored in quarter D, the bag now being sandwiched between these quarters and blocking port 16. The array of pores 19 in the upper wall of the bag now lies within the confines of port 16 and the resultant vent is exposed thereby.

To prevent the discharge into the atmosphere of aroma from the array of pores, sealing port 16 is a circular sticker 20 having a pull tab 21, the sticker being formed of transparent synthetic plastic film material, such as PVC. It is essential that the sticker be transparent so that when the card is unfolded, a viewer can then see the colored beads 18 in the transparent bag 17 underlying the port.

Figure 5:
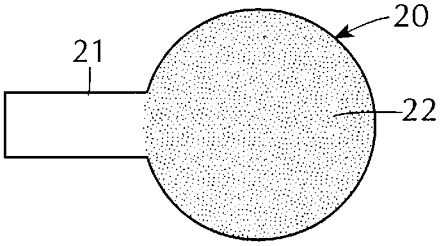
FIG. 5 is a separate view of the sticker.
Figure 6:
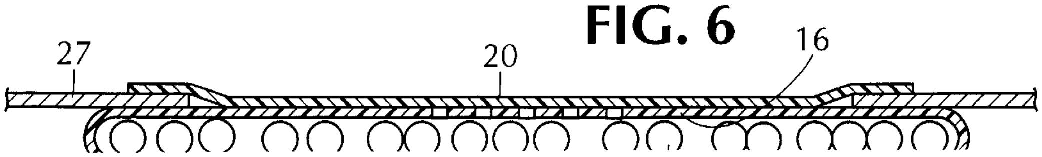
FIG. 6 is a section taken through FIG. 3 in the plane indicated by line 6—6.

As shown in FIG. 5, the underside of sticker 20 is coated with a clear pressure-sensitive adhesive layer. Hence when sticker 20 is adhered to quarter B to cover port 16 therein, it then shutters the vent in the bag underlying the port and seals the bag to prevent the discharge of aroma therein.

Figure 7:
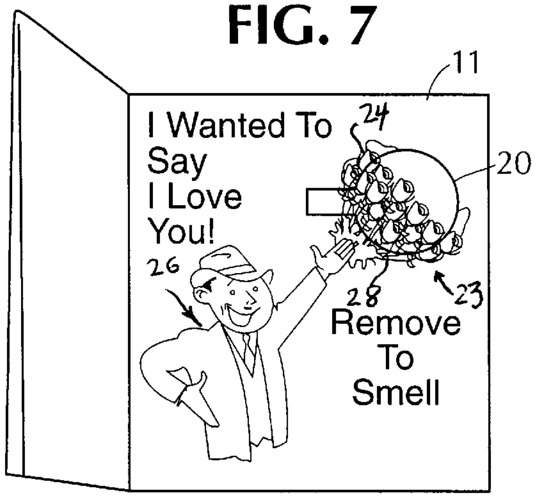
FIG. 7 shows the rear panel of the folder.

Rear panel 11 of the greeting card holder, as shown in FIG. 7, has printed therein a message appropriate to Valentine's Day, such as "I just wanted to say I love you!"

In order to simulate the presentation of a bouquet of roses to the recipient of the greeting card, a bouquet 23 is created graphically. This is achieved by printing in red a cluster of roses 24 in the region surrounding the rose-colored beads in the transparent bag exposed by port 16, the cluster of roses being visually integrated with the beads. Green-colored stalks 28 extending from the cluster of roses 24 are clasped by a hand of a printed presenter 26.

Thus when a recipient of the mailed greeting card unfolds it to read the Valentine's Day message, she then sees a simulated bouquet 23 of roses. This bouquet assumes a three-dimensional form, depth being imparted thereto by the collection of rose-colored beads 18 below port 16.

Tab 21 of sticker 20 has "remove sticker" printed thereon, and when the recipient of the greeting card peels off the sticker, the aroma of roses from the simulated bouquet is then discharged into the atmosphere, thereby consummating the experience of being presented with the bouquet.

This experience is not of short duration, for the collection of impregnated beads in the bag provide a fragrance reservoir capable of discharging an aroma into the atmosphere for many days. Should the recipient wish to retain the fragrance reservoir for a prolonged period, she has only to reseal the reservoir with the sticker.

It is not necessary that the greeting card folder be formed by a rectangular sheet folded in quarters to create double ply front and rear panels 10 and 11, as shown in the figures.

Instead, the folder may be formed of a single rectangular sheet that is folded in half to create single ply front and rear panels. In that case, a port in the rear panel is blocked by a relatively flat gas barrier bag containing impregnated beads placed behind the port and adhered to the single-ply rear panel. And in practice, instead of beads, one may insert within the bag a pad of open-cell foam plastic material impregnated with a fragrance appropriate to the occasion.

Thus the fragrance in the case of an Easter greeting card can be that of lilies, and in the case of a X-mas card can be that of the pine needles of a X-mas tree. The fragrances are not limited to plant aromas, but may include those simulating the smell of foods, such as roast turkey for a Thanksgiving greeting card, that of the sea for a BON VOYAGE greeting card or what aroma is usually associated with the occasion for the greeting card.

While there has been shown and described a preferred embodiment of an aroma-generating greeting card in accordance with the invention, it will be appreciated that many changes and modifications may be made therein without, however, departing from the essential spirit thereof.

I claim:

1. An aroma-generating greeting card comprising:

A. a folder having a front panel folding over a rear panel, said front panel having a greeting printed thereon appropriate to a given occasion, said rear panel having printed thereon a message related to the greeting and being provided with a port; and B. a gas-barrier bag containing a fragrance reservoir mounted behind and blocking the port, said bag having a vent therein that lies within the port confines of whereby an aroma from said fragrance reservoir is discharged through said port; and C. a removable sticker overlying said port to seal said fragrance reservoir whereby an aroma is discharged only when the sticker is removed.

2. A greeting card as set forth in claim 1, in which the fragrance reservoir is formed by a group of porous plastic beads impregnated with said fragrance.

3. A greeting card as set forth in claim 2, in which the fragrance is a synthetic fragrance which is chemically reactive with inks with which the card is printed, said beads and said bag being formed of a synthetic plastic material non-reactive with said fragrance.

4. A greeting card as set forth in claim 3, in which said bag is formed of a polyester.

5. A greeting card as set forth in claim 1, in which the occasion is associated with a particular type of flower having a scent, and the fragrance has the scent of this flower.

6. A greeting card as set forth in claim 5, in which the occasion is Valentine's Day and the flower is a rose.

7. A greeting card as set forth in claim 6, in which the bag is formed of transparent plastic film material and the beads are rose colored.

8. A greeting card as set forth in claim 7, on which the region of the rear panel surrounding the port is printed with a cluster of roses that are visually integrated with the rose-colored beads.

9. A greeting card as set forth in claim 1, in which a sticker is formed of transparent synthetic plastic film whose undersurface is coated with a pressure-sensitive adhesive.

10. A greeting card as set forth in claim 1, in which said folder is formed of a rectangular sheet of paper folded in quarters to create a double-ply front panel formed by folded over left side quarters and a double-ply rear panel formed of folded over right side quarters, said port being formed in an upper right side quarter and said bag which blocks the port being sandwiched between the upper right side quarter and a lower right side quarter.

* * * * *